United States Patent
Li et al.

(10) Patent No.: US 12,435,023 B2
(45) Date of Patent: Oct. 7, 2025

(54) CRYSTAL FORM OF TREPROSTINIL SODIUM SALT AND PREPARATION METHOD THEREFOR

(71) Applicant: Shanghai Forefront Pharmaceutical Co., Ltd, Shanghai (CN)

(72) Inventors: Wei Li, Shanghai (CN); Yi Ren, Shanghai (CN)

(73) Assignee: SHANGHAI FOREFRONT PHARMCEUTICAL CO., LTD., Shanghai (CN)

( * ) Notice: Subject to any disclaimer, the term of this patent is extended or adjusted under 35 U.S.C. 154(b) by 986 days.

(21) Appl. No.: 17/612,491

(22) PCT Filed: May 20, 2020

(86) PCT No.: PCT/CN2020/091218
§ 371 (c)(1),
(2) Date: Nov. 18, 2021

(87) PCT Pub. No.: WO2020/233588
PCT Pub. Date: Nov. 26, 2020

(65) Prior Publication Data
US 2022/0242811 A1    Aug. 4, 2022

(30) Foreign Application Priority Data

May 21, 2019 (CN) .......................... 201910425686.1
Sep. 23, 2019 (CN) .......................... 201910899910.0

(51) Int. Cl.
C07C 59/72        (2006.01)
A61K 31/192       (2006.01)
A61K 45/06        (2006.01)
C07C 51/43        (2006.01)

(52) U.S. Cl.
CPC ............ *C07C 59/72* (2013.01); *A61K 31/192* (2013.01); *A61K 45/06* (2013.01); *C07C 51/43* (2013.01); *C07B 2200/13* (2013.01)

(58) Field of Classification Search
CPC ....... C07C 59/72; C07C 51/43; A61K 31/192; A61K 45/06; C07B 2200/13
See application file for complete search history.

(56) References Cited

U.S. PATENT DOCUMENTS 8,350,079 B2 * 1/2013 Walsh ................. A61P 9/00
                                                  562/466
9,550,716 B2    1/2017 Giust et al.

FOREIGN PATENT DOCUMENTS

| CN | 102015613 A | 4/2011 |
| CN | 105164098 A | 12/2015 |
| CN | 107001221 A | * 8/2017 |
| CN | 109734580 A | * 5/2019 |
| KR | 2017123132 | * 11/2017 |
| WO | 2012088607 A1 | 7/2012 |
| WO | 2016055819 A1 | 4/2016 |

OTHER PUBLICATIONS

Int'l Search Report issued Jul. 24, 2020 in Int'l Application No. PCT/CN2020/091218.

* cited by examiner

*Primary Examiner* — John S Kenyon
*Assistant Examiner* — Sara Elizabeth Bell
(74) *Attorney, Agent, or Firm* — Panitch Schwarze Belisario & Nadel LLP

(57) ABSTRACT

Disclosed are a new crystal form of treprostinil sodium salt (the structural formula thereof is shown as formula I) and a preparation method therefor. Specifically, disclosed are a five and half hydrates of the treprostinil sodium salt and some dehydrated crystal forms thereof. The new crystal form has better stability and hygroscopicity. As a treprostinil crude drug, the new crystal form can meet the requirements for storage and loading and transportation, is stable in terms of quality and can guarantee the controllable quality of subsequent preparation products.

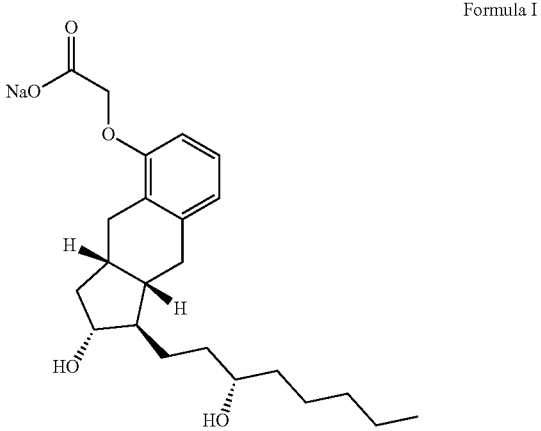

Formula I

8 Claims, 6 Drawing Sheets

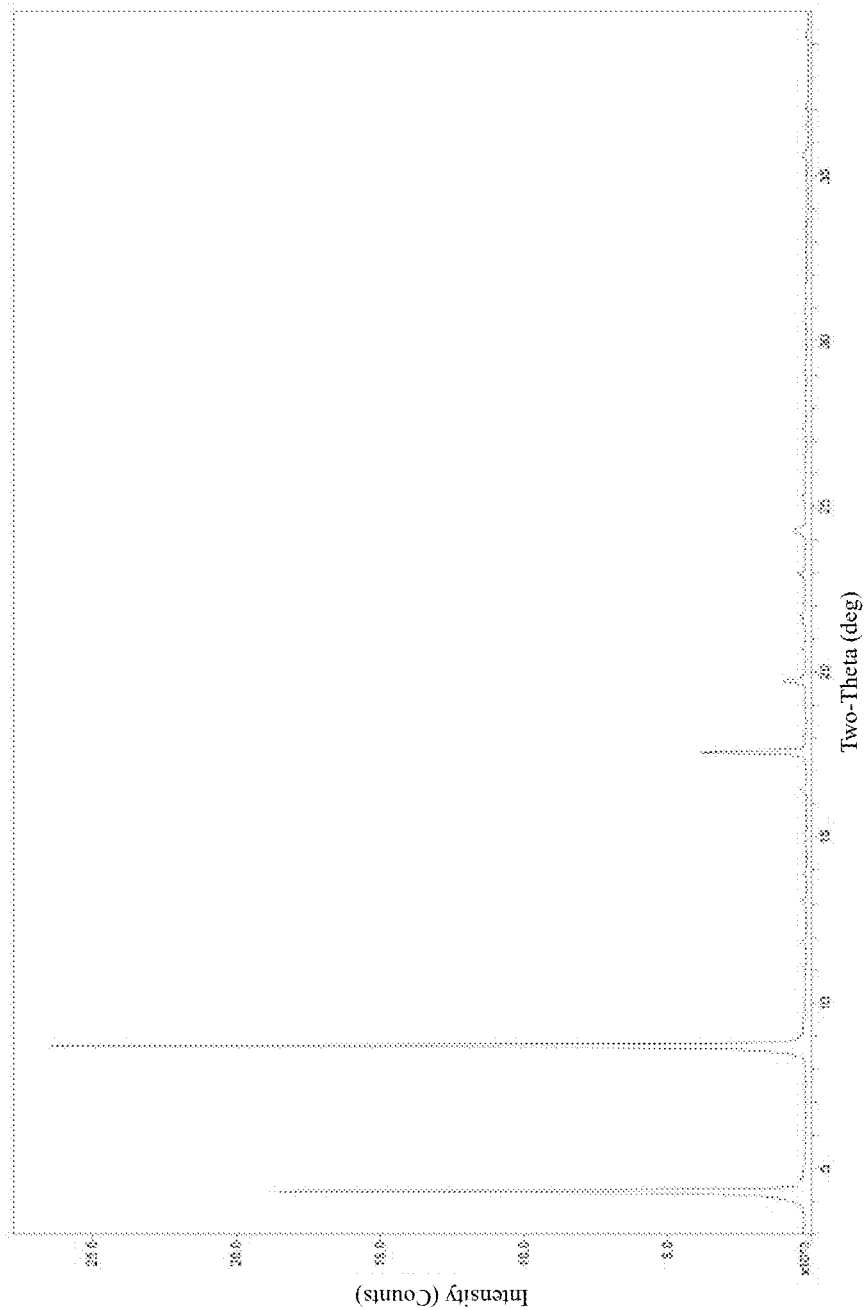
Fig. 1: XRPD pattern of the five-and-a-half hydrate of Treprostinil sodium salt

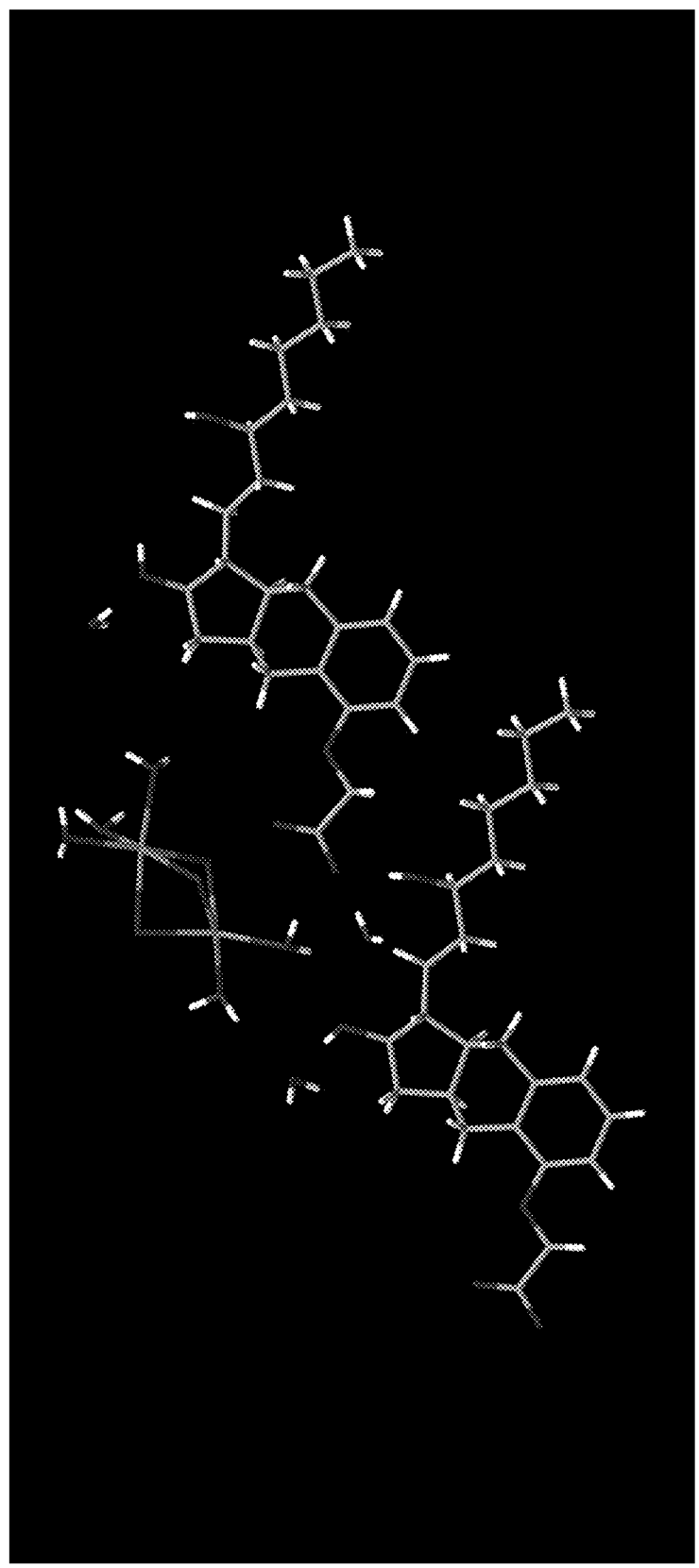
Fig. 2: Single crystal analysis of the five-and-a-half hydrate of Treprostinil sodium salt

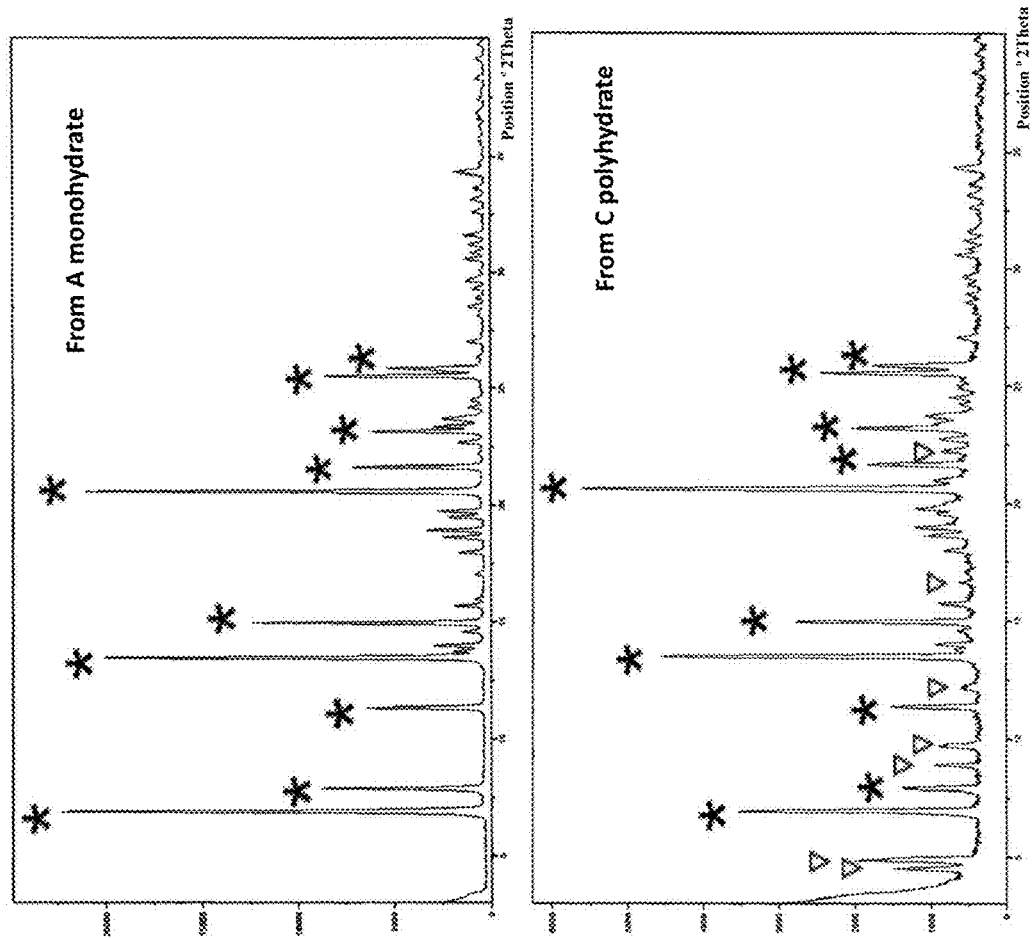
Fig. 3: Comparison of XRPD patterns of monohydrate (Form A) and polyhydrate (Form C) provided by WO2016055819

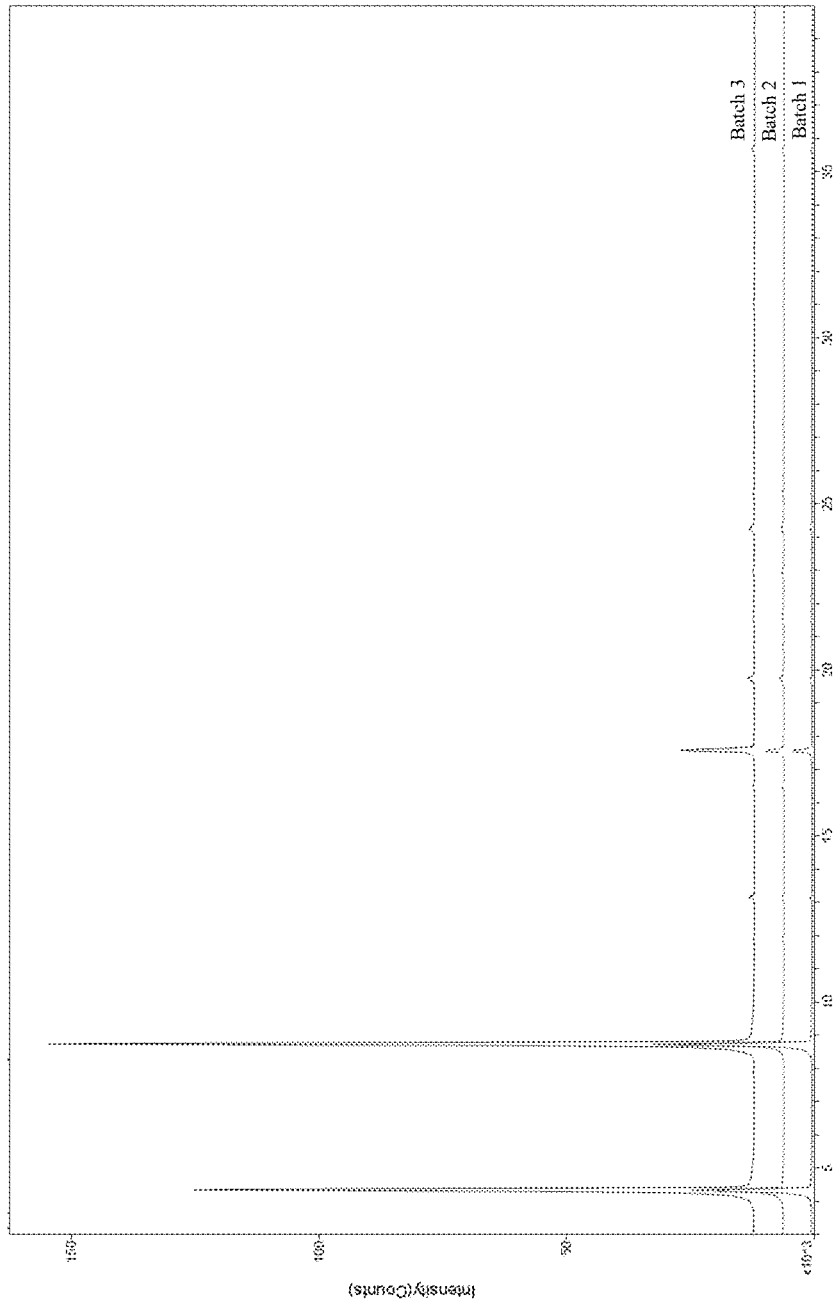
Fig. 4: Comparison of XRPD patterns of five-and-a-half hydrate of Treprostinil sodium salt from three consecutive batches.

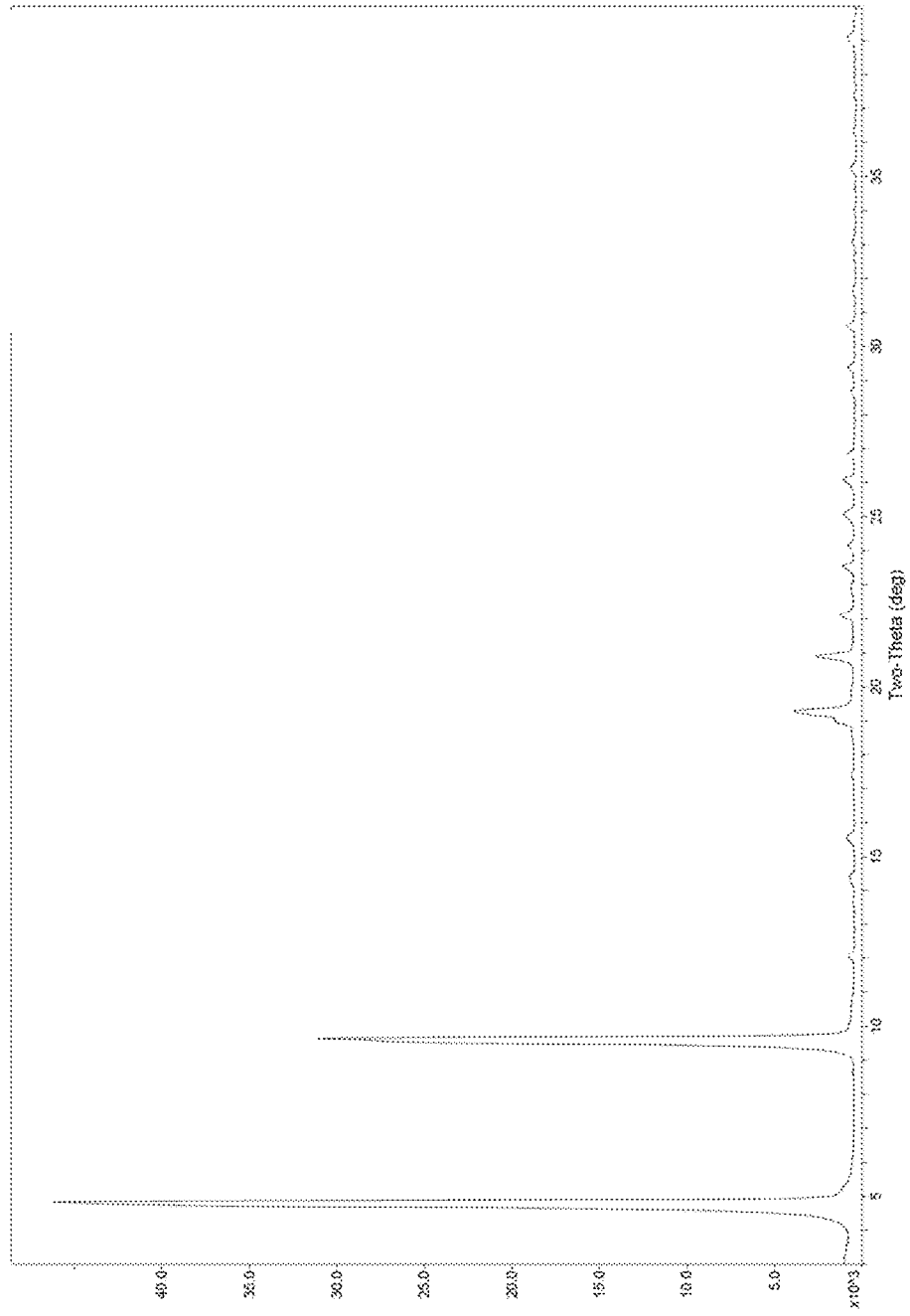
Fig. 5: partially dehydrated crystal form I of the five-and-a-half hydrate of Treprostinil sodium salt

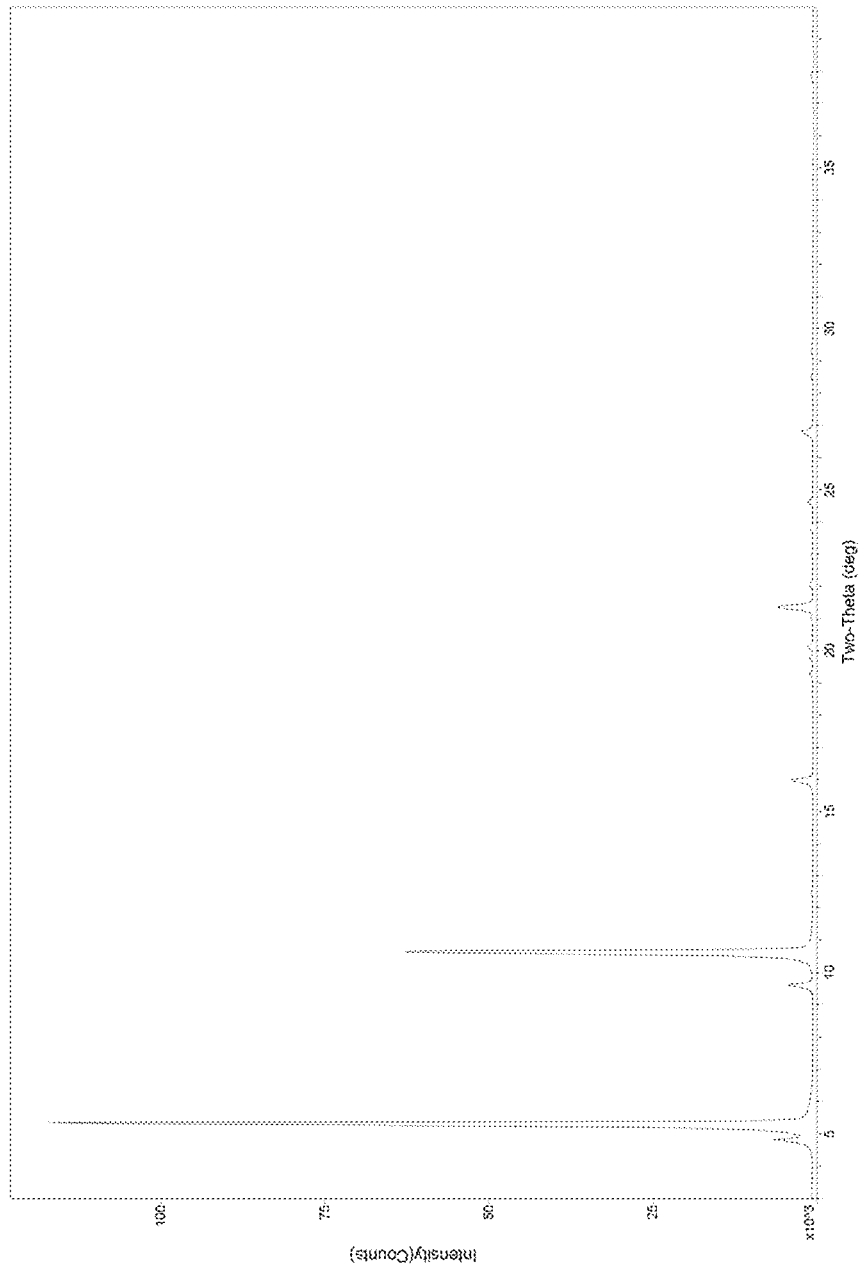
Fig. 6: partially dehydrated crystal form II of the five-and-a-half hydrate of Treprostinil sodium salt

CRYSTAL FORM OF TREPROSTINIL SODIUM SALT AND PREPARATION METHOD THEREFOR

CROSS-REFERENCE TO RELATED APPLICATIONS

This application is a Section 371 of International Application No. PCT/CN2020/091218, filed May 20, 2020, which was published in the Chinese language on Nov. 26, 2020, under International Publication No. WO 2020/233588 A1, which claims priority under 35 U.S.C. § 119(b) to Chinese Application No. 201910425686.1, filed May 21, 2019, and Chinese Application No. 201910899910.0, filed Sep. 23, 2019, the disclosure of each of which is incorporated herein by reference in its entirety.

TECHNICAL FIELD

The present invention relates to the field of drug preparation, particularly, the present invention discloses a new crystal form of Treprostinil sodium salt and preparation method thereof.

BACKGROUND

Treprostinil, a derivative of prostacyclin, is a drug for treating pulmonary hypertension, which has the activities of inhibiting platelet aggregation and relaxing blood vessels. The approved dosage forms thereof are injections, inhalants and oral tablets, wherein the APIs of injections and inhalants are Treprostinil sodium salt.

There are few reports on the crystal form of Treprostinil sodium salt and preparation thereof in the known art. U.S. Pat. No. 9,550,716 and WO2016/055819 respectively describe the preparation of Treprostinil sodium salt in a mixed solvent system of organic solvent and water. The inventors prepared Treprostinil sodium salt by referring to the methods reported in these two documents, and found that there are problems such as poor crystallization effect, obvious moisture absorption and formation of viscous substances during the filtration process, insufficient solid-state stability, etc., which cannot meet the commercial requirements for quality stability of APIs and formulations thereof (Example 3 and Example 4).

Usually, something used as APIs need to have good stability, moisture absorption and crystallinity to ensure that APIs can meet the requirements of storage, shipment and have stable quality in order to ensure that the quality of the subsequent formulation products are controllable.

Therefore, as an important drug for the treatment of pulmonary hypertension, there is an urgent need for a crystal form of Treprostinil sodium salt with controllable quality and stability meeting the requirements of an API, and a method for stable preparation of the corresponding crystal form. Thereby, high-quality Treprostinil drug products are provided to meet the needs of treatment better.

SUMMARY OF INVENTION

The present invention discloses a new crystal form of Treprostinil sodium salt (see Formula 1 for its structure) and a preparation method thereof. Particularly, the present invention discloses a five-and-a-half (5.5) hydrate of Treprostinil sodium salt and partial dehydrated crystal forms thereof, as well as preparation method thereof. The new crystal forms have better stability and hygroscopicity, and as APIs of Treprostinil, can meet the requirements of storage and shipment and have stable quality, to ensure that the quality of subsequent formulations is controllable.

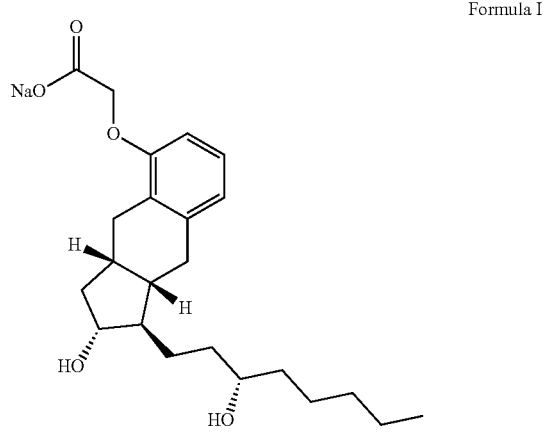

Formula I

The first aspect of the present invention provides a five-and-a-half hydrate of Treprostinil sodium salt, wherein the powder X-ray diffraction (Cu-Ka, 1.54178 Å) pattern thereof has characteristic peaks at the following 2Theta angle positions:

4.3°±0.2°, 8.7°±0.2° and 17.6°±0.2°.

In one embodiment of the first aspect of the present invention, the powder X-ray diffraction (Cu-Ka, 1.54178 Å) pattern of the five-and-a-half hydrate of Treprostinil sodium salt further has characteristic peaks at the following 2Theta angle positions:

13.1°±0.2°, 19.7°±0.2° and 24.3°±0.2°.

In another embodiment of the first aspect of the present invention, the powder X-ray diffraction (Cu-Ka, 1.54178 Å) pattern of the Treprostinil sodium salt five-and-a-half hydrate has characteristic peaks at the 2Theta angle listed in Table 1.

In another embodiment of the first aspect of the present invention, the powder X-ray diffraction (Cu-Ka, 1.54178 Å) pattern of the five-and-a-half hydrate of Treprostinil sodium salt is as shown in FIG. 1.

The second aspect of the present invention provides a five-and-a-half hydrate of Treprostinil sodium salt having unit cell parameters as listed in Table 2.

The third aspect of the present invention provides a method for preparing the above-mentioned five-and-a-half hydrate of Treprostinil sodium salt, wherein the method comprises the following steps:

(1) dissolving Treprostinil in sodium hydroxide aqueous solution;

(2) adding acetonitrile to the sodium hydroxide solution of Treprostinil for crystallization.

There are no special restrictions on temperature, time, stir and the like in the above-mentioned steps (1) and (2), and those skilled in the art can select appropriate conditions according to actual needs.

In one embodiment of the third aspect of the present invention, the weight (g): volume (ml) ratio of Treprostinil to the sodium hydroxide aqueous solution is from 1:1 to 1:5, e.g. 1:1, 1:1.5, 1:2, 1:2.5, 1:3, 1:3.5, 1:4, 1:4.5 or 1:5.

In one embodiment of the third aspect of the present invention, the concentration of the sodium hydroxide aqueous solution is from 5 wt % to 15 wt %, e.g. 5 wt %, 6 wt %, 7 wt %, 8 wt %, 9 wt %, 10 wt %, 11 wt %, 12 wt %, 13 wt %, 14 wt % or 15 wt %.

In one embodiment of the third aspect of the present invention, the volume (ml): volume (ml) ratio of the sodium hydroxide aqueous solution to acetonitrile is from 1:15 to 1:55.

In one embodiment of the third aspect of the present invention, the crystallization temperature is from 0° C. to 30° C., for example 0° C., 5° C., 10° C., 15° C., 20° C., 25° C. or 30° C.

The fourth aspect of the present invention provides a partially dehydrated crystal form I of five-and-a-half hydrate of Treprostinil sodium salt, wherein the powder X-ray diffraction (Cu-Ka, 1.54178 Å) pattern thereof has characteristic peaks at the following 2Theta angle positions:

4.8°±0.2°, 9.6°±0.2° and 19.3°±0.2°.

In one embodiment of the fourth aspect of the present invention, the powder X-ray diffraction pattern (Cu-Ka, 1.54178 Å) of the partially dehydrated crystal form I of the five-and-a-half hydrate of Treprostinil sodium salt further has characteristic peaks at the following 2Theta angle positions:

20.9°±0.2°, 22.1°±0.2° and 23.5°±0.2°.

In another embodiment of the fourth aspect of the present invention, the powder X-ray diffraction pattern (Cu-Ka, 1.54178 Å) of the partially dehydrated crystal form I of the five-and-a-half hydrate of Treprostinil sodium salt has characteristic peaks at the 2Theta angle positions listed in Table 7.

In another embodiment of the fourth aspect of the present invention, the powder X-ray diffraction pattern (Cu-Ka, 1.54178 Å) of the partially dehydrated crystal form I of the five-and-a-half hydrate of Treprostinil sodium salt is as shown in FIG. 5.

The fifth aspect of the present invention provides a the partially dehydrated crystal form II of the five-and-a-half hydrate of Treprostinil sodium salt, and the powder X-ray diffraction (Cu-Ka, 1.54178 Å) pattern thereof has characteristic peaks at the following 2Theta angle positions:

5.3°±0.2°, 10.6°±0.2° and 16.0°±0.2°.

In one embodiment of the fifth aspect of the present invention, the powder X-ray diffraction pattern (Cu-Ka, 1.54178 Å) of the partially dehydrated crystal form II of the five-and-a-half hydrate of Treprostinil sodium salt further has characteristic peaks at the following 2Theta angle positions:

20.1°±0.2°, 21.4°±0.2° and 26.8°±0.2°.

In another embodiment of the fifth aspect of the present invention, the powder X-ray diffraction (Cu-Ka, 1.54178 Å) pattern of the partially dehydrated crystal form II of the five-and-a-half hydrate of Treprostinil sodium salt has characteristic peaks at 2Theta angle positions listed in table 8.

In another embodiment of the fifth aspect of the present invention, the powder X-ray diffraction pattern (Cu-Ka, 1.54178 Å) of the partially dehydrated crystal form II of the five-and-a-half hydrate of Treprostinil sodium salt is as shown in FIG. 6.

The sixth aspect of the present invention provides a method for preparing a pharmaceutical composition, wherein comprising the steps of:
(1) using the five-and-a-half hydrate of Treprostinil sodium salt, the partially dehydrated crystal form I of the five-and-a-half hydrate of Treprostinil sodium salt and/or the partially dehydrated crystal form II of the five-and-a-half hydrate of Treprostinil sodium salt as solid form of the raw material of the active ingredient Treprostinil;

(2) mixing the five-and-a-half hydrate of Treprostinil sodium salt, the partially dehydrated crystal form I of the five-and-a-half hydrate of Treprostinil sodium salt and/or the partially dehydrated crystal form II of the five-and-a-half hydrate of Treprostinil sodium salt with pharmaceutically acceptable carriers to obtain the pharmaceutical composition.

The seventh aspect of the present invention provides a pharmaceutical composition characterized in that the pharmaceutical composition comprises the above-mentioned five-and-a-half hydrate of Treprostinil sodium salt, partially dehydrated crystal form I of the five-and-a-half hydrate of Treprostinil sodium salt and/or partially dehydrated crystal form II of the five-and-a-half hydrate of Treprostinil sodium salt and pharmaceutically acceptable carriers.

The eighth aspect of the present invention provides a use of the above-mentioned five-and-a-half hydrate of Treprostinil sodium salt, partially dehydrated crystal form I of the five-and-a-half hydrate of Treprostinil sodium salt, partially dehydrated crystal form II of the five-and-a-half hydrate of Treprostinil sodium salt and/or the pharmaceutical compositions, alone or in combination with other drugs, in preparing a drug for treating pulmonary hypertension, lung hypertension, pulmonary fibrosis, interstitial pulmonary disease, chronic obstructive pulmonary disease, asthma, ischemic disease, heart failure, arteriosclerosis, postoperative anticoagulation, central retinal vein occlusion, thrombotic microangiopathy, peripheral vascular disease, heart-lung transplantation and other diseases.

Compared with the prior art, the main advantages of the present invention include:
(1) The five-and-a-half hydrate of the Treprostinil sodium salt disclosed in the present invention has better stability and hygroscopicity, which ensures that the API can meet the requirements of storage and shipment, and has stable quality.
(2) The five-and-a-half hydrate of the Treprostinil sodium salt disclosed in the present invention has better effect in removing impurities, which is beneficial for preparing high-quality APIs of Treprostinil sodium salt.
(3) The preparation method of the five-and-a-half hydrate of the Treprostinil sodium salt disclosed in the present invention is stable, which is beneficial for the preparation of high-quality APIs and formulations of Treprostinil sodium salt.

It should be understood that within the scope of the present invention, the above-described technical features of the present invention and the technical features described in detail below (e.g., embodiments) may be combined with each other to constitute a new or preferred technical solution. Limited by space, it will not repeat them here.

DESCRIPTION OF THE DRAWINGS

FIG. 1: the XRPD pattern of the five-and-a-half hydrate of Treprostinil sodium salt.

FIG. 2: Single crystal analysis results of the five-and-a-half hydrate of Treprostinil sodium salt.

FIG. 3: Comparison of XRPD patterns of monohydrate (Form A) and polyhydrate (Form C) provided by WO2016055819.

FIG. 4: Comparison of XRPD patterns of five-and-a-half hydrate of Treprostinil sodium salt from three consecutive batches.

FIG. 5: XRPD pattern of the partially dehydrated crystal form I of the five-and-a-half hydrate of Treprostinil sodium salt.

FIG. 6: XRPD pattern of the partially dehydrated crystal form II of the five-and-a-half hydrate of Treprostinil sodium salt.

DETAILED DESCRIPTION OF THE INVENTION

After a long-term and in-depth research, the inventor surprisingly found that the Treprostinil sodium salt can form a five-and-a-half hydrate, which has good crystallinity, excellent stability and hygroscopicity, and also shows good purification effect, and the crystal forms I and II formed by partial dehydrated from the five-and-a-half hydrate also have good crystallinity. The present invention has been completed on this basis.

The present invention will be further explained below in conjunction with specific embodiments. It should be understood that these embodiments are only used to illustrate the present invention and not to limit the scope of the present invention. In the following examples, the test methods without specific conditions are usually in accordance with conventional conditions or the conditions recommended by the manufacturer.

Terms

XRPD X-Ray Powder Diffraction
DVS Dynamic Vapor Sorption
Rel. Int. Relative Intensity
wt % weight percentage

Example 1

Preparation of Treprostinil Free Acid

With reference to the preparing method of Treprostinil free acid reported in document "*J. Org. Chem.* 2004, 69, 1890-1902", using (1R,2R,3aS,9aS)-2,3,3a,4,9,9a-hexahydro-1-[(3S)-3-hydroxyoctyl]-1H-phenyl[f]indene-2,5-diol as the starting material, 34.5 g of Treprostinil free acid was obtained with HPLC purity of 98.9%.

Example 2

Preparation of Five-and-a-Half Hydrate of Treprostinil Sodium Salt 1 g of crude Treprostinil was weighed and added into a 50 ml pear-shaped bottle, 1.5 ml 7 wt % sodium hydroxide aqueous solution was added, and stirred until clear.

Under stirring conditions, 28.5 mL acetonitrile was slowly added in dropwise to form a suspension. The suspension was stirred overnight at 25° C.

The solids were filtered out, and dried at 25±2 & RH 60±5% for 1 day to give 1.2 g white solid, with a yield of ~90%. The purity of the solid was determined by high performance liquid chromatography, the morphology was characterized by XRPD, and the water content was determined by Karl Fischer method. The specific test methods are as follows.

High performance liquid chromatography: Column: Agilent Proshell C18, column temperature: 30° C., flow rate: 0.5 ml/min, detection wavelength: 210 nm.

XRPD: Cu target, Ka wavelength, tube voltage 40 KV, tube current 40 mA. Scan range: 3-40° 2-Theta; step: 0.02°; scan speed: 1 step/second.

Karl Fischer method: volumetric water titrator.

The results of liquid chromatography analysis showed that the purity of crude Treprostinil was increased from 98.9% to 99.9% after being crystallized into five-and-a-half hydrate of Treprostinil sodium salt. There is an obvious effect in removing impurities.

Karl Fischer titration results showed that the water content after drying is 20.9 wt %.

The XRPD pattern of five-and-a-half hydrate of Treprostinil sodium salt is as shown in FIG. 1. The main diffraction peaks and relative intensities thereof are as shown in Table 1.

TABLE 1

| XRPD data of five-and-a-half hydrate of Treprostinil sodium salt | |
| --- | --- |
| Pos. [°2Th.] | Rel. Int. [%] |
| 4.3 | 79.4 |
| 8.7 | 100.0 |
| 11.9 | 1.0 |
| 13.1 | 1.0 |
| 16.5 | 1.2 |
| 17.6 | 14.6 |
| 18.0 | 1.0 |
| 19.2 | 1.1 |
| 19.7 | 4.6 |
| 21.5 | 1.2 |
| 21.7 | 2.2 |
| 23.0 | 1.6 |
| 24.3 | 2.9 |
| 30.9 | 1.0 |
| 31.0 | 1.1 |
| 35.6 | 1.6 |

The single crystal diffraction pattern of five-and-a-half hydrate of Treprostinil sodium salt is as shown in FIG. 2. The single crystal diffraction results shown that the number of crystal water is 5.5. The unit cell parameters are shown in Table 2.

TABLE 2

| Unit cell parameters of five-and-a-half hydrate of Treprostinil sodium salt | |
| --- | --- |
| Crystal system | Orthogonal crystal system |
| Space group | P2$_1$2$_1$2$_1$ |
| a/Å | 7.6983(2) |
| b/Å | 18.0393(4) |
| c/Å | 39.1744(10) |
| α/° | 90 |
| β/° | 90 |
| γ/° | 90 |
| Flack parameter | 0.05(3) |

Different crystallization process parameters including concentration of sodium hydroxide, volume of acetonitrile and temperature were screened, the operation steps are as described above. As shown in Table 3, the results showed that the same crystal forms of five-and-a-half hydrate of Treprostinil sodium salt are obtained with different crystallization process parameters.

TABLE 3

Summary of products obtained with different crystallization process parameters

| Treprostinil free acid | Sodium hydroxide | Acetonitrile | Temperature | Crystal form of product |
| --- | --- | --- | --- | --- |
| 1 g | 1.5 ml 10 wt % sodium hydroxide aqueous solution | 28.5 ml | 25 | Five-and-a-half hydrate of Treprostinil sodium salt |

TABLE 3-continued

Summary of products obtained with different crystallization process parameters

| Treprostinil free acid | Sodium hydroxide | Aceto-nitrile | Temperature | Crystal form of product |
|---|---|---|---|---|
| 1 g | 1.5 ml 10 wt % sodium hydroxide aqueous solution | 50 ml | 25 | Five-and-a-half hydrate of Treprostinil sodium salt |
| 1 g | 1.5 ml 10 wt % sodium hydroxide aqueous solution | 75 ml | 25 | Five-and-a-half hydrate of Treprostinil sodium salt five-point-five hydrate |
| 1 g | 1.5 ml 10 wt % sodium hydroxide aqueous solution | 28.5 ml | 5 | Five-and-a-half hydrate of Treprostinil sodium salt |
| 1 g | 1.5 ml 7 wt % sodium hydroxide aqueous solution | 28.5 ml | 5 | Five-and-a-half hydrate of Treprostinil sodium salt |
| 1 g | 1.5 ml 7 wt % sodium hydroxide aqueous solution | 50 ml | 25 | Five-and-a-half hydrate of Treprostinil sodium salt |
| 1 g | 1.5 ml 7 wt % sodium hydroxide aqueous solution | 75 ml | 25 | Five-and-a-half hydrate of Treprostinil sodium salt |

Example 3

Treprostinil Sodium Salt as Described in U.S. Pat. No. 9,550,716

Treprostinil sodium salt was prepared according to the method described in U.S. Pat. No. 9,550,716, as follows:

1.5 g of crude Treprostinil was dissolved in 37 ml acetone and heated to 30° C., 0.9 ml 5M NaOH was added slowly dropwise, and maintained at 30° C. and stirred for 15 minutes. After the reaction system was stirred at room temperature for 1 hour, white crystals precipitated. Then the reaction system was placed in the ice water bath and stirred for another hour. The solid was filtered and washed with acetone. It is found that the solid became sticky rapidly during washing and filtration. After resulting solids was dried at room temperature, 0.8 g solid was obtained with a yield of ~52%.

The solid was placed at a condition of 25 degrees and 80% relative humidity for 24 hours, and it was found that the solid deliquesced into a viscous solution, which showed that the solid was extremely hygroscopic and could not meet the requirements of drugs for product quality stability.

Example 4

Treprostinil Sodium Salt as Described in WO2016055819

Treprostinil sodium salt was prepared according to the method described in WO 2016055819, but the crystal form described in this patent can not be obtained. The specific processes are as follows:

Form A 0.25 g crude Treprostinil was dissolved in 3.3 ml ethanol, and added 87 mg sodium carbonate monohydrate, stirred at room temperature for 16 hours under $N_2$ protection. The pH value of the solution was tested and is 6, which was failed to meet the requirement of pH 7-9 as described in WO2016055819, because the solubility of sodium carbonate in ethanol was low. After filtering out the insoluble sodium carbonate, the ethanol solution was placed in a rotary evaporator to give oil, then 2 ml of water-saturated methyl tert-butyl ether was added and stirred overnight to give white viscous semi-solids, which was determined as amorphous by polarizing microscope.

Form B 0.25 g crude Treprostinil was dissolved in 3.3 ml ethanol, and 87 mg sodium carbonate monohydrate was added, stirring at room temperature for 16 hours under $N_2$ protection, the pH of the solution was tested is 6, which failed to meet the requirement of pH 7-9 described in WO2016055819, because the solubility of sodium carbonate in ethanol was low. After filtering out the insoluble sodium carbonate, the ethanol solution was put on a rotary evaporator to give an oil, then 2 ml of methyl tert-butyl ether was added and stirred overnight to give a white viscous semi-solid, which was confirmed as amorphous by polarizing microscope.

According to the description of WO2016055819, both Form A and Form B are converted into Form C at 60% relative humidity, indicating that the solid-state stability of both crystal forms cannot meet the requirements for commercial production of Treprostinil sodium salt APIs/formulations.

Polyhydrate Form C

According to the description of WO2016055819, Form C can only be obtained by transformation of Form A and/or Form B, and it is not disclosed that Form C can be obtained directly by crystallization. By comparing the XRPD patterns of monohydrate (Form A) and polyhydrate (Form C) provided by WO2016055819 (FIG. 4), it can be found that Form C is not a single crystal form, but should be a mixture of Form A (diffraction peak marked with *) and other crystal forms (diffraction peak marked with ∇). As a mixed crystal form, it is difficult to ensure that the mixing ratio remains constant from batch to batch, thus the polyhydrate Form C cannot meet the requirements for crystalline stability in the commercial production of Treprostinil sodium salt APIs/formulations.

Example 5

Hygroscopicity of Five-and-a-Half Hydrate of Treprostinil Sodium Salt

Hygroscopicity is one of the key physicochemical properties of drugs and has a significant impact on drug stability, powderological properties and subsequent processing procedure. The hygroscopicity of five-and-a-half hydrate of Treprostinil sodium salt was evaluated by dynamic vapor sorption (DVS), and the results are shown in Table 4.

TABLE 4

Water content of five-and-a-half hydrate of Treprostinil sodium salt at the following humidity (RH %)/temperature (° C.)

| Humidity/Temperature | Water content wt % |
|---|---|
| 40.0/25° C. | 18.6 |
| 45.0/25° C. | 18.7 |
| 50.0/25° C. | 18.7 |
| 55.0/25° C. | 18.8 |
| 60.0/25° C. | 18.8 |
| 65.0/25° C. | 18.9 |
| 70.0/25° C. | 18.9 |
| 75.0/25° C. | 19.0 |
| 80.0/25° C. | 19.7 |
| 85.0/25° C. | 19.9 |

TABLE 4-continued

Water content of five-and-a-half hydrate of Treprostinil sodium salt at the following humidity (RH %)/temperature (° C.)

| Humidity/Temperature | Water content wt % |
|---|---|
| 90.0/25° C. | 20.5 |
| 95.0/25° C. | 22.6 |

When the relative humidity increased from 40% to 80%, the increasing value of the water content, i.e., hygroscopicity, of five-and-a-half hydrate of Treprostinil sodium salt is 1.1 wt %. According to the definition of hygroscopicity in European Pharmacopoeia, its hygroscopicity is slight hygroscopicity, which proves that after forming the five-and-a-half hydrate, Treprostinil sodium salt can keep a low level of hygroscopicity within the range of conventional humidity, thus ensuring that the quality of Treprostinil sodium salt API is stable.

Example 6 five-and-a-half hydrate of Treprostinil sodium salt was placed in a watch glass, spread into a thin layer with no more than 1 mm thickness and placed into a stability test chamber at 40±2° C. and 75±5% relative humidity for 6 months.

The purity of samples after stability test was determined by HPLC, the water content of samples after stability test was determined by Karl Fischer titration, and the crystal form of samples after stability test was determined by XRPD. The results are shown in Table 5. The five-and-a-half hydrate of Treprostinil sodium salt showed excellent chemical stability and solid-state stability, that fully met the requirements of API for stability.

TABLE 5

Accelerated stability of five-and-a-half hydrate of Treprostinil sodium salt

| Time | Appearance | Purity % | Water % | crystal form |
|---|---|---|---|---|
| 0 day | Off-white powder | 99.97 | 20.1 | five-and-a-half hydrate of Treprostinil sodium salt |
| 1 month | Off-White powder | 99.97 | 20.4 | five-and-a-half hydrate of Treprostinil sodium salt |
| 3 months | Off-white powder | 99.96 | 20.0 | five-and-a-half hydrate of Treprostinil sodium salt |
| 6 months | Off-white powder | 99.98 | 20.2 | five-and-a-half hydrate of Treprostinil sodium salt |

Example 7

Stability of Crystallization Process of Five-and-a-Half Hydrate of Treprostinil Sodium Salt Three consecutive batches of five-and-a-half hydrate of Treprostinil sodium salt were prepared by process of Example 2 of the present invention, and the results are shown in Table 6 and FIG. 4. The results of the three batches showed that the crystallization process has good repeatability, stable product quality and completely meets the requirements for commercial production.

TABLE 6

Data of five-and-a-half hydrate of Treprostinil sodium salt from three consecutive batches

| Batch number | water, % | Purity, % |
|---|---|---|
| 1# | 20.4 | 99.9 |
| 2# | 20.3 | 99.9 |
| 3# | 20.4 | 99.9 |

Example 8

Partially Dehydrated Form I of the Five-and-a-Half Hydrate of Treprostinil Sodium Salt The five-and-a-half hydrate of Treprostinil sodium salt was placed in a sealed container, and the ambient relative humidity was controlled at 30%. After the weight was completely constant, the solid morphology was characterized by XRPD.

The XRPD pattern of partially dehydrated crystal from I of the five-and-a-half hydrate of Treprostinil sodium salt is shown in FIG. 5. The main diffraction peaks and relative intensities are shown in Table 7.

TABLE 7

XRPD data of dehydrated crystal from I of the five-and-a-half hydrate of Treprostinil sodium salt

| Pos. [°2Th.] | Rel. Int. [%] |
|---|---|
| 4.8 | 100.0 |
| 9.6 | 67.2 |
| 15.6 | 1.0 |
| 19.3 | 7.5 |
| 20.9 | 4.7 |
| 22.1 | 1.7 |
| 23.5 | 1.4 |
| 25.1 | 1.3 |
| 26.1 | 1.2 |
| 26.8 | 1.0 |
| 29.4 | 1.0 |
| 30.6 | 1.1 |
| 39.1 | 1.2 |

Example 9

Partially Dehydrated Crystalline from II of the Five-and-a-Half of Treprostinil Sodium Salt The five-and-a-half hydrate of Treprostinil sodium salt was placed in a sealed container, and the ambient relative humidity was controlled at 10%. After the weight was constant, the solid morphology was characterized by XRPD.

The XRPD pattern of the partially dehydrated crystal form II of the five-and-a-half hydrate of Treprostinil sodium salt is shown in FIG. 6. The main diffraction peaks and relative intensities are shown in Table 8. It can be seen from the XRPD pattern that the partial dehydrated crystal form II of the five-and-a-half hydrate of Treprostinil sodium salt is mixed with a small amount of partial dehydrated crystal form I of the five-and-a-half hydrate of Treprostinil sodium salt.

TABLE 8

XRPD data of dehydrated crystal form II of the five-
and-a-half hydrate of Treprostinil sodium salt

| Pos. [°2Th.] | Rel. Int. [%] |
|---|---|
| 5.3 | 100.0 |
| 10.6 | 53.6 |
| 16.0 | 2.9 |
| 20.1 | 0.7 |
| 21.4 | 4.6 |
| 26.8 | 2.3 |

Example 10

Comparison of Water Solubility of the Five-and-a-Half Hydrate of Treprostinil Sodium Salt, Dehydrated Crystal Form I of the Five-and-a-Half Hydrate of Treprostinil Sodium Salt, Partially Dehydrated Crystal Form II of the Five-and-a-Half Hydrate of Treprostinil Sodium Salt and Treprostinil Free Acid 20 mg of Treprostinil free acid was weighed and added into a volumetric flask, 200 mL of water was added, and placed in a water bath pot (temperature was controlled at 25±2° C.), shook strongly for 30 seconds every 5 minutes, and the dissolution within 30 minutes was observed. Results showed that the Treprostinil free acid was insoluble and its water solubility is less than 0.1 mg/ml.

About 100 mg of the five-and-a-half hydrate of Treprostinil, the partially dehydrated crystal form I of five-and-a-half hydrate of Treprostinil sodium, the partially dehydrated crystalline II of five-and-a-half hydrate of Treprostinil sodium was weighed and added into volumetric flasks, 1 mL of water was added, and placed in a water bath pot (temperature was controlled at 25±2° C.), shook strongly for 30 seconds every 5 minutes, and the dissolution within 30 minutes was observed. The results showed that five-and-a-half hydrate of Treprostinil, partially dehydrated crystal form I of five-and-a-half hydrate of Treprostinil sodium salt and partially dehydrated crystal form II of five-and-a-half hydrate of Treprostinil sodium salt are completely dissolved, and the solubility are more than 100 mg/ml.

The water solubility of the five-and-a-half hydrate of Treprostinil sodium salt and the partially dehydrated crystal form I and partially dehydrated crystal form II thereof are far better than that of Treprostinil free acid. Solubility is the key factor that restricts the release of drugs in vivo, and insufficient solubility will lead to the uncompleted release of drugs and then affect their bioavailability. Therefore, the five-and-a-half hydrate of Treprostinil sodium salt and partially dehydrated crystal form I and partially dehydrated crystal form II thereof have better effect on practical application.

All documents referred to in the present invention are incorporated by reference herein as if each document is individually incorporated by reference. Further, it should be understood that upon reading the above teaching of the present invention, various modifications or modifications may be made to the present invention by those skilled in the art, and those equivalents also fall within the scope defined by the appended claims of the present application.

The invention claimed is:

1. A five-and-a-half hydrate of Treprostinil sodium salt, or a hydrate partially dehydrated crystal form II thereof,
    wherein the powder X-ray diffraction (Cu-Ka, 1.54178 Å) pattern of the five-and-a-half hydrate of Treprostinil sodium salt has characteristic peaks at the following 2Theta angle positions:
    4.3°±0.2°, 8.7°±0.2° and 17.6°±0.2°;
    and
    the powder X-ray diffraction (Cu-Ka, 1.54178 Å) pattern of the hydrate partially dehydrated crystal form II of the five-and-a-half hydrate of Treprostinil sodium salt has characteristic peaks at the following 2Theta angle positions:
    5.3°±0.2°, 10.6°±0.2° and 16.0°±0.2°.

2. The five-and-a-half hydrate of Treprostinil sodium salt of claim 1, wherein the powder X-ray diffraction (Cu-Ka, 1.54178 Å) pattern thereof further has characteristic peaks at the following 2Theta angle positions:
    13.1°±0.2°, 19.7°±0.2° and 24.3°±0.2°.

3. The five-and-a-half hydrate of Treprostinil sodium salt of claim 1, wherein the powder X-ray diffraction (Cu-Ka, 1.54178 Å) pattern thereof is as shown in FIG. 1.

4. A method for preparing the five-and-a-half hydrate of Treprostinil sodium salt of claim 1, wherein the method comprises the following steps:
    (1) dissolving Treprostinil in sodium hydroxide aqueous solution;
    (2) adding acetonitrile to the sodium hydroxide solution of Treprostinil for crystallization to form solids; and
    (3) filtering out the solids and drying at 25±2° C. and RH 60±5% to yield the five-and-a-half hydrate of Treprostinil sodium salt.

5. The five-and-a-half hydrate of Treprostinil sodium salt according to claim 1, wherein the powder X-ray diffraction (Cu-Ka, 1.54178 Å) pattern of the hydrate partially dehydrated crystal form II further has characteristic peaks at the following 2Theta angle positions:
    20.1°±0.2°, 21.4°±0.2° and 26.8°±0.2°.

6. The five-and-a-half hydrate of Treprostinil sodium salt according to claim 1, wherein the powder X-ray diffraction (Cu-Ka, 1.54178 Å) pattern of the hydrate partially dehydrated crystal form II as shown in FIG. 6.

7. A pharmaceutical composition, wherein the pharmaceutical composition comprises the five-and-a-half hydrate of Treprostinil sodium salt and/or the partially dehydrated crystal form II thereof according to claim 1, and pharmaceutically acceptable carriers.

8. A method for treating a disease or disorder, comprising a step of:
    administering to a subject in need thereof the five-and-a-half hydrate of Treprostinil sodium salt and/or the partially dehydrated crystal form II thereof according to claim 1 and/or a pharmaceutical composition comprising the same, alone or in combination with other drugs;
    wherein the disease or disorder is selected from the group consisting of pulmonary hypertension, lung hypertension, pulmonary fibrosis, interstitial pulmonary disease, chronic obstructive pulmonary disease, asthma, ischemic disease, heart failure, arteriosclerosis, postoperative anticoagulation, central retinal vein occlusion, thrombotic microangiopathy, peripheral vascular disease, and heart-lung transplantation.

* * * * *